March 24, 1931.  R. L. CAMPBELL ET AL  1,797,897
AUTOMATIC BINDER HITCH
Filed Sept. 3, 1929
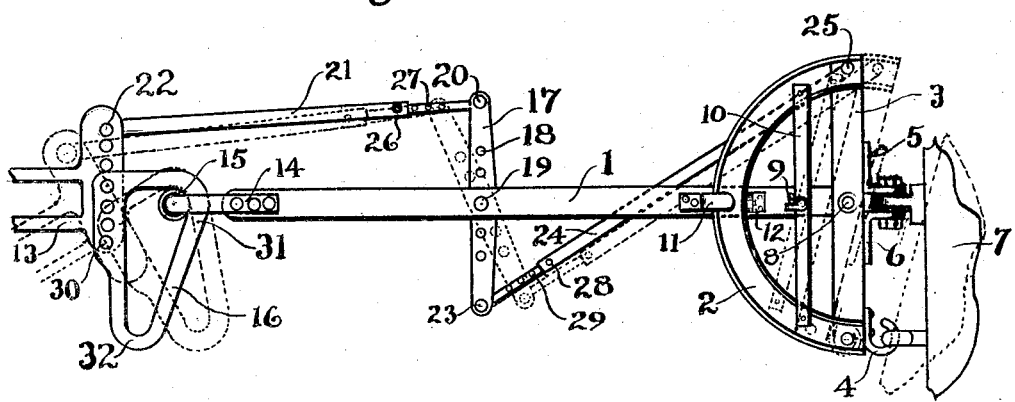
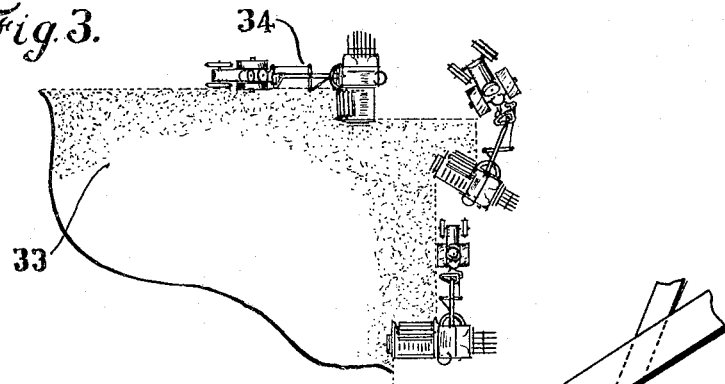
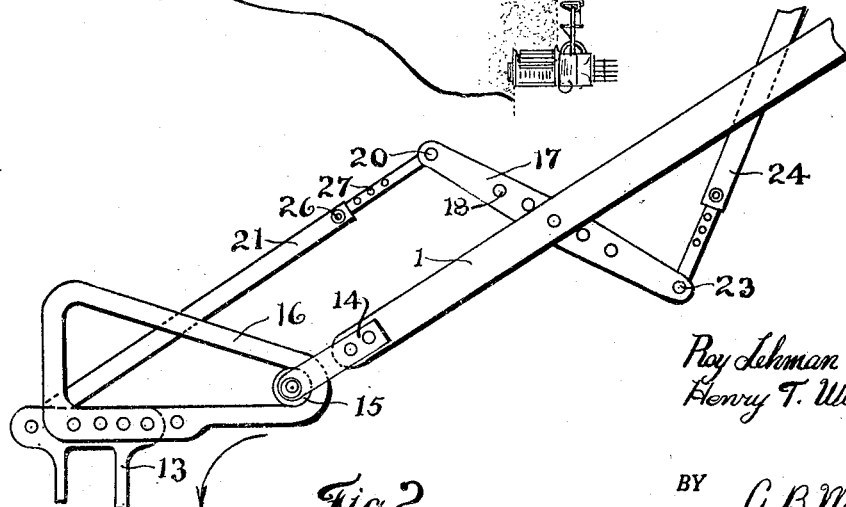
Roy Lehman Campbell
Henry T. Winterbauer
INVENTORS
BY A. B. McCall
ATTORNEYS.

Patented Mar. 24, 1931

1,797,897

UNITED STATES PATENT OFFICE

ROY LEHMAN CAMPBELL, OF ATHENS, AND HENRY T. WINTERBAUER, OF FANCY PRAIRIE, ILLINOIS

AUTOMATIC BINDER HITCH

Application filed September 3, 1929. Serial No. 389,920.

Our invention relates to implements of a class adapted to be used in connection with the harvesting operations; an object being in this device particularly to provide an apparatus for connecting up a grain binder or other implements with a tractor or other means of locomotion when cutting grain in the field.

An object of our invention is to provide an apparatus which will materially aid in the control of grain binders in negotiating turns at a corner in a grain patch.

A particular object of our invention is to provide an apparatus as an automatic binder hitch which will make it possible to turn the binders at a corner in a manner that will not miss any grain and cause the same to turn out in a somewhat larger arc to a given limit to get the binder in a position that will permit the tractor to turn sharply while the binder stands still within certain limits of a tractor's movement, after which the binder follows the tractor in proper alignment with the grain standing at the corner so that no grain will be missed at the corner in negotiating a turn.

A further object of our invention is to provide an apparatus for the purpose above mentioned that will be economical to manufacture and convenient to operate.

We attain the objects of our invention in the device described in the annexed specifications, recited in the claims and illustrated in the accompanying drawings, in which like reference numerals indicate like parts in the several figures.

Referring to the figures:

Fig. 1 is a top or plan view of the automatic binder hitch invention shown as it would be connected with a tractor and a binder. In this view is also shown the relative position of the respective parts in their adjusted position which they would take when a tractor is making a turn to the left, causing the binder to take a turn slightly to the right in order to turn out somewhat in a larger arc.

Fig. 2 is a detail showing the relative position of the triangular connecting draw-bar which connects the coupling of the hitch with a tractor draw-bar. In this view the relative position of the parts are shown as they would be with a tractor turned at an angle to the position of hitch coupling bar or tongue.

Fig. 3 is a sketch of a corner of a field of grain showing the operating connection between the tractor and the binder when in normal use and showing also the position of the binder and tractor when they turn a curve, in the attempt to illustrate the advantage and the merits of our automatic binder hitch.

Referring now to the details of our automatic binder hitch and the preferred method of operating the same, we provide on the rear end of a coupling —1— a fifth-wheel member —2— operatively connected with a bar —3— provided with a hook —4— and pulling plates —5— and —6—; and adapted to be connected with a binder —7— so as to pull the binder when the same is in normal use.

The fifth-wheel —2— with beam —3— is pivotally mounted on coupling —1— at point —8—.

When a binder is attached or hitched to the fifth-wheel —2— to plates —4—, —5—, and —6—, the tilting lever of a binder is hooked onto bracket —9— on bar —10— on fifth-wheel —2—; thus to keep the binder properly adjusted in position.

On coupling —1— is also mounted a plate —11— serving as a stop member for limiting the vertical vibration of fifth-wheel —2— as it is in normal use while under the fifth-wheel at this point is a roller member —2— to make it easier to turn the fifth-wheel on pivot —8— as the binder is turned through coupling —1— connecting the same with a tractor draw-bar —13—.

In this forward end of coupling —1— is a yoke —14— and preferably a roller —15— mounted thereon and operatively connected with a triangular draw bar —16— which is rigidly secured to the tractor draw bar —13— when in normal use.

Approximately midway of the length of coupling —1— is a cross lever —17— provided with a plurality of pivot holes —18— adapted to be pivotally secured to coupling —1— by a bolt extending through hole —19— of the coupling.

At one end —20— of cross lever —17— is an adjustable connecting rod —21— pivotally connected with cross lever —17— at one end of the connecting rod and pivotally connected to the draw bar —13— of a tractor through one of the plurality of holes —22— in this draw bar.

At the opposite end —23— of cross lever —17— there is pivotally connected an adjustable connecting rod —24— having its other end pivotally connected to fifth-wheel —2— at point —25—.

Connecting rod —21— is made adjustable by bolt —26— through any one of holes —27— of the rod while connecting rod —24— is made adjustable by a bolt —28— extending through any one of a plurality of holes —29—.

It will be noted that triangular draw-bar —16— is provided with a plurality of holes —30— for connection with corresponding groups of holes, one of which is indicated by numeral —22—. This triangular draw-bar is secured to the draw bar —13— of the tractor so as to make the normal pull of the binder come at point —31— in this draw-bar behind the tractor draw-bar, while at the smaller angle of this triangular draw-bar is provided together with the slanted slide between points —31— and —32— so as to make it possible for a tractor to make a left hand turn at an angle to the relative position of the binder coupling when desired, when negotiating a turn in a field; and so that such turn may be made by the tractor without the coupling turning, also to permit the binder to stand still while this sharp turn is being made, after the binder has been pulled up to a predetermined position before requiring the binder to make the turn.

The dotted lines in Fig. 1 are provided to show the relative change in position of the several moving parts of our automatic binder hitch when it is desired to turn the tractor to the left at a corner, and at the same time cause the binder to turn somewhat to the right before it is time for the tractor to make a sharp angle turn to get properly adjusted for starting on the other side of the grain patch.

After the tractor has made a turn the relative position of draw-bar —13— of the tractor, triangular draw bar —16—, then coupling —1— connecting rod —21— and cross lever —17— is shown in detail in Fig. 2 with the arrow in this figure to indicate the direction in which the tractor has made the turn.

After making this sharp turn the tractor will start on its run down along the side of grain patch —33— in a position indicated by numeral —34—. As the tractor starts down along the side of the grain patch the action of the lever system will cause the binder to turn out at the corner sufficiently to come back to a position to cut all the grain while getting lined up for the run along the other side of the grain patch, at right angles to the position in which it operated when on the adjacent side of the patch.

In previous attempts to provide an automatic binder hitch or implement hitch others have made it possible to cause a binder to turn out somewhat when making a turn at a corner but in making such attempts there was not provided an arrangement for permitting the binder to avoid also making a large turn in negotiating the corner. In a study of the drawings in this application, it will be observed that not only provision is made for turning the binder out at the corner in a relatively small arc; but provision is also made for enabling the tractor to make a sharp turn when desired without interfering with the necessary movement of the binder.

It will also be noted that at the same time that the tractor is making a sharp turn at the corners that the binder is permitted to stand still while the short turn is being made by the tractor.

As the tractor negotiates the turn the grain wheel of the binder acts as a pivot while the bull wheel describes an arc around the corner of the standing grain and when the tractor completes the turn and as the roller —15— returns to its normal pulling position at point —31— of the triangular draw bar then the lever system effectively operates to force the binder back into its normal alignment behind the tractor, thus causing the grain wheel of the binder to roll back enough to clear the standing grain and start the binder out in operating alignment with the tractor again.

After the tractor turn is complete, then through the lever system including connecting rods —21—, —24— and cross lever —17— then by the tractor pull on coupling —1— through triangular draw bar —16— the binder straightens out for the run in following the tractor along the other side of grain patch —33—.

To those who are skilled in the use of farm implements especially in the line of harvesting implements, it will be evident that in the operative details of this device, we are providing an apparatus that is positive in all its actions and will accomplish the purpose set forth, and having thus described the nature of our invention, what we claim is:

1. An automatic binder hitch comprising a coupling, a pivotally mounted fifth wheel operatively secured at one end thereof for attachment to a binder and the like, a clevis link of triangular shape loosely and operatively connected with the opposite end of said coupling and adapted to be operatively secured to the draw bar of a tractor and the like; an adjustable lever pivotally mounted across said coupling approximately midway of its ends; an adjustable connecting rod connecting one end of said lever with the adjacent end of said draw bar of a tractor; a second connecting rod connecting the opposite end of said lever diagonally across said coupling with the oppositely disposed terminal of said fifth wheel.

2. As a new article of manufacture an implement hitch comprising in co-operative combination a coupling having a pivoted fifth wheel at one end and means for operatively securing the same to a harvesting implement, a triangular draw bar secured to a tractor draw-bar and connected with said coupling by a pulling link; said link provided with a roller; an adjustable cross lever pivotally mounted on said coupling and connected by one end to said draw-bar of a tractor by an adjustable connecting rod and connected by a second adjustable connecting rod secured to the other end and pivotally connected diagonally across said coupling to the oppositely disposed terminal of said fifth wheel of the coupling; whereby when a tractor is pulling an implement by said hitch the implement may be caused thereby to turn in a smaller arc than a tractor hitched thereto in negotiating a corner within predetermined limits of movement and the implement caused to pivotally move while the tractor makes a further turn within predetermined limits before the implement again follows the tractor.

3. An automatic implement hitch comprising a tongue, having a fifth wheel pivotally connected therewith at one end and having means at said end for attachment with grain binders and the like; said tongue operatively supporting said fifth wheel, a roller on said tongue supporting the fifth wheel and a stop bracket for limiting the vertical vibration of said fifth wheel; a triangular draw bar normally disposed horizontally, secured to a draw bar of a tractor and connected by a roller and yoke to the other end of said tongue; an adjustable cross lever pivotally connected with said tongue and connected at its opposite ends by connecting rods with said tractor and said fifth wheel respectively; one of said connecting rods pivotally connected with the draw bar of a tractor adjacent the secured position of said triangular draw bar, the other connecting rod pivotally connected at one end with the opposite end of said cross lever and pivotally connected at the other diagonally across said tongue to the oppositely disposed terminal of said fifth-wheel; and means for connecting a tilting lever of a binder and the like to the member forming said fifth-wheel; said triangular draw bar secured to said tractor draw-bar so as to be operatively disposed to one side thereof.

4. In an automatic binder hitch of the character described having a coupling provided with a fifth-wheel at one end operatively secured to a binder, a triangular draw-bar connected by a roller to the other end of the coupling and rigidly secured to a tractor draw bar; a lever system including a cross lever pivotally and adjustably secured to the coupling, an adjustable lever pivotally secured to said tractor and pivotally secured to the adjacent end of said cross lever and a second adjustable lever pivotally secured to the opposite end of said cross lever and pivotally connected diagonally across said coupling to the oppositely disposed terminal of said fifth-wheel member of the coupling.

5. In an automatic binder hitch of the character described having a fifth-wheeled coupling for controllable steering connection between a tractor and a grain binder, the combination with a triangular draw-bar secured to the draw bar of a tractor and horizontally disposed with a major portion to one side thereof and connected by a roller with said coupling, of a lever system for automatically steering the binder, and including a cross lever pivotally connected across said coupling, an adjustable connecting rod pivotally connected with said tractor bar and with the adjacent end of said cross lever; and a second adjustable connecting rod pivotally connected with the other end of said cross lever diagonally across said coupling and pivotally connected with the furthermost terminal of said fifth wheel of the coupling.

In witness whereof, we hereunto set our hands this 2nd day of August, 1928.

ROY LEHMAN CAMPBELL.
HENRY T. WINTERBAUER.